(12) United States Patent
Hiki

(10) Patent No.: US 6,481,394 B1
(45) Date of Patent: Nov. 19, 2002

(54) CONTROL SYSTEM FOR TWO-CYCLE ENGINE

(75) Inventor: Keiichi Hiki, Shizuoka (JP)

(73) Assignee: Sanshin Kogyo Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/671,102

(22) Filed: Sep. 27, 2000

(30) Foreign Application Priority Data

Sep. 27, 1999 (JP) ............................................ 11-272974
Sep. 27, 1999 (JP) ............................................ 11-272975

(51) Int. Cl.$^7$ .......................... F02D 13/00; F02B 27/06
(52) U.S. Cl. ...................... 123/65 PE; 123/295; 60/285
(58) Field of Search ........................ 123/65 PE, 65 PD, 123/65 P, 300, 90.11, 90.15, 295, 305; 60/285

(56) References Cited

U.S. PATENT DOCUMENTS

| | | | |
|---|---|---|---|
| 4,723,514 A | * 2/1988 | Taniuchi | 123/322 |
| 4,763,613 A | * 8/1988 | Arahata et al. | 123/65 PE |
| 4,920,932 A | * 5/1990 | Schlunke | 123/65 PE |
| 5,190,006 A | 3/1993 | Motoyama et al. | 123/305 |
| 5,322,044 A | 6/1994 | Maebashi | 123/305 |
| 5,400,755 A | 3/1995 | Maebashi | 123/339 |
| 5,575,246 A | * 11/1996 | Ito | 123/65 PE |
| 5,599,253 A | * 2/1997 | Ishibashi et al. | 477/111 |
| 5,642,705 A | * 7/1997 | Morikawa et al. | 123/300 |
| 5,697,332 A | * 12/1997 | Asai et al. | 123/65 PE |
| 5,769,041 A | * 6/1998 | Suzuki et al. | 123/73 C |
| 5,782,214 A | 7/1998 | Nanami et al. | 123/65 PE |
| 5,885,120 A | 3/1999 | Yamazaki et al. | 440/84 |
| 5,885,122 A | 3/1999 | Fujimoto | 440/89 |
| 5,967,862 A | 10/1999 | Motose | 440/1 |
| 6,007,392 A | 12/1999 | Motose | 440/89 |
| 6,021,748 A | 2/2000 | Motose | 123/65 PE |
| 6,039,012 A | 3/2000 | Motoyama | 123/65 PE |
| 6,039,013 A | 3/2000 | Motose | 123/65 PE |
| 6,041,591 A | * 3/2000 | Kaneko et al. | 60/274 |
| 6,062,189 A | * 5/2000 | Kaneko et al. | 123/295 |
| 6,240,724 B1 | * 6/2001 | Kudou et al. | 60/284 |

FOREIGN PATENT DOCUMENTS

| | | | | |
|---|---|---|---|---|
| GB | 2256945 | * | 12/1992 | F02D/41/08 |
| JP | 111632 | * | 5/1991 | F02D/13/02 |

* cited by examiner

Primary Examiner—Tony M. Argenbright
Assistant Examiner—Hai H. Huynh
(74) Attorney, Agent, or Firm—Knobbe, Martens, Olson & Bear LLP

(57) ABSTRACT

A two cycle engine includes an exhaust control valve, which opens and closes an exhaust port, and a controller for controlling the exhaust valve. The controller is configured to increase the effective cross-sectional area of the exhaust port when an engine speed increases beyond a specified value and to adjust the amount of fuel injected into the combustion chamber based upon the sensed position of the exhaust control valve. A method for controlling a two-cycle engine is also disclosed. The method comprises determining an engine speed, using the engine speed to determine a target position for an exhaust control valve, moving the exhaust valve towards the target position, sensing a position of the exhaust control valve, and determining a fuel injection amount from at least the sensed position of the exhaust valve and the engine speed.

41 Claims, 12 Drawing Sheets

CONTROL SYSTEM FOR TWO-CYCLE ENGINE

RELATED APPLICATIONS

This application is based on Japanese Patent Application No. 11-272974, filed Sep. 27, 1999, and Japanese Patent Application No. 11-272975, filed Sep. 27, 1999. The entire contents of these patents are hereby expressly incorporated by reference.

BACKGROUND OF THE INVENTION

1. Field of the Invention

The present invention generally relates to a combustion control system for a two-cycle engine. More specifically, the present invention relates to an improved fuel injection system and an improved method for operating a fuel injection system.

2. Related Art

Personal watercraft have become very popular in recent years. This type of watercraft is quite sporting in nature and carries one or more riders. Due to space limitations and power demands, personal watercraft typically are powered by two-stroke engines. Two-stroke engines include an exhaust port provided in each cylinder wall such that spent gases are exhausted through the exhaust port as the piston reciprocates in the cylinder. The timing of the opening and closing of the exhaust port has an important effect on engine performance. Exhaust port timing can be adjusted with exhaust control valves. Optimum exhaust port timing is dependent, in part, upon engine speed. For instance, to improve engine performance, the exhaust port timing typically is advanced during high-speed/high-load engine operation (e.g., engine speeds greater than 6000 RPM) relative to the exhaust port timing during engine idling or low-speed/low-load operation. In other words, the valve is "opened" during high-speed/high-load operation and "closed" during low-speed/low-load operation. This results in lower compression ratios at high-speed/high-load conditions, which reduces the pressure in the combustion chamber and inhibits some pre-ignition or knocking conditions. Correspondingly, by delaying exhaust port timing during idling or low-speed/low-load conditions, higher compression ratios result, which typically improve engine performance at low-speed/low-load conditions.

As discussed above, one manner of controlling exhaust port timing is to employ exhaust timing control valves. Generally, these valves are of the sliding or rotating type and do not serve to ever completely close the opening or port in each combustion chamber in two-stroke applications. Instead, each valve moves between a first position, in which the valve does not obstruct, or obstructs very little of, the exhaust port, and a second position, in which the valve partially obstructs the port. Therefore, the exhaust control valve can alter the effective cross-sectional area of the exhaust port by appearing to lower an upper surface of the exhaust port, thereby restricting the flow through the exhaust port. This alters the timing of the opening and closing of the exhaust ports. That is, by retracting the exhaust control valve into the exhaust port, it is possible to advance exhaust port timing. In a similar manner, by extending the exhaust control valve into the exhaust port, it is possible to delay exhaust port timing. The engine control system usually is configured to retract the exhaust valve when the engine speed/load increases beyond a specified value (e.g., 6000 RPM) and to extend the exhaust control valve when the engine speed/load decreases beyond the certain value.

Personal watercraft usually begin to plane at approximately 2000–3500 RPM. While planing, it is not uncommon for the personal watercraft to jump out of the water. When this occurs, the engine speed suddenly increases because of the hull is no longer substantially affected by water resistance. Moreover, when the watercraft lands on the water, the engine speed suddenly slows down due to the sudden increase in the water resistance. These sudden changes in engine speed can cause the engine to stall or can cause irregular combustion within the engine.

To improve emissions, personal watercraft typically include a catalyst for cleaning the exhaust gases. The catalyst typically is not activated until the temperature of the exhaust gas entering the catalyst reaches 250–300 C. To achieve this temperature in the exhaust gas, the watercraft typically needs to be traveling around 25 Km/hour (i.e., a planing speed with an engine speed more than 2000–3500 RPM). However, near shore and/or in swimming areas, personal watercraft typically must be operated below a certain speed (e.g. below 10 km/hour). At these speeds, the exhaust gas temperature is usually about 100 C., which is insufficient to activate the catalyst. Thus, the exhaust gas cannot be adequately cleaned near shore and/or in swimming areas.

SUMMARY OF THE INVENTION

An aspect of the present invention is the recognition that the tendency of the watercraft to stall or to experience irregular combustion during jumping and landings is caused, at least, in part by the movement of the exhaust control valves. Specifically, in personal watercraft, the exhaust control valves typically are driven by a servo-motor, which is controlled by the engine control system. The engine control system generally is configured to open or close the exhaust control valve when the engine speed increases or decreases beyond a specified engine speed (e.g., 6000 RPM). However, the servo-motor typically experiences a response delay on the order of one to two seconds.

This response delay can result in engine stalling and/or irregular combustion. For instance, when the watercraft jumps out of the water, the engine speed increases quickly and the engine control system, in response, delivers more fuel to the engine and opens the exhaust valve. However, because of the response delay, the exhaust control valve is only partially opened when more fuel is delivered to the engine. Nevertheless, less air enters the combustion chamber because the valve obstructs exhaust gas flow from combustion chamber. This results in a rich air/fuel ratio, which can cause irregular combustion. Correspondingly, when the watercraft is landing, the engine speed decreases quickly and the engine controls system delivers less fuel to the engine and closes the exhaust valve. However, because of the response delay, the control valve is partially opened while less fuel is delivered to the engine. Thus, too much air enters the combustion chamber in comparison to the amount of fuel being delivered to the engine. This results in a lean air/fuel ratio, which can cause the engine to stall.

Accordingly, one aspect of the present invention involves a two-cycle, internal combustion engine. The engine comprises a cylinder block that defines a cylinder bore. A cylinder head is fixed at one end of the cylinder block and encloses one end of the cylinder bore. A crankcase member is fixed at the other end of the cylinder block and encloses the other end of the cylinder bore. The crankcase member forms a crankcase chamber. A piston is positioned in the cylinder bore. A crankshaft is rotably journaled in the crankcase and is driven by the piston. The piston, the cylinder bore, and the cylinder head together define a combustion chamber. At least one scavenge passage is formed in the cylinder block for transferring an air charge compressed in the crankcase to the combustion chamber. The scavenge passage comprises a scavenge port configured such that reciprocating motion of the piston opens and closes the scavenge port. An exhaust passage is formed in the cylinder block for discharging exhaust gases from the combustion chamber. The exhaust passage includes an exhaust port configured such that the reciprocating motion of the piston opens and closes the exhaust port. A fuel injector is mounted to inject fuel directly into the combustion chamber. The fuel injector includes an actuator to regulate an amount of fuel injected by the fuel injector, an exhaust control valve extends into the exhaust passage and is adapted to control the effective cross-sectional area of the exhaust port. An exhaust control valve position sensor a senses the position of the exhaust control valve. The position sensor is electronically connected to a control system. The control system includes a controller that is configured to control the position of the exhaust control valve, the amount of fuel injected by the fuel injector, and to receive a signal from the exhaust control valve position sensor. The controller is also configured to increase the effective cross-sectional area of the exhaust port when an engine speed increases beyond a specified value and to adjust the amount of fuel injected into the combustion chamber based upon the sensed position of the exhaust control valve.

Another aspect of the present invention involves a method of operating a two-cycle internal combustion engine. The method includes sensing a position of an exhaust control valve. An engine speeds is also sensed. The amount of fuel injected by a fuel injector is adjusted based upon the sensed position of the exhaust control valve and the engine speed.

Yet another aspect of the present invention involves a two-cycle internal combustion engine. The engine comprises a cylinder block that defines a cylinder bore. A cylinder head is fixed at one end of the cylinder block and encloses one end of the cylinder bore. A crankcase member is fixed at the other end of the cylinder block and encloses the other end of the cylinder bore. The crankcase member defines a crankcase chamber. A piston is positioned in the cylinder bore. A crankshaft is rotably journaled in the crank case and is driven by the piston. The piston, the cylinder bore, and the cylinder head together define a combustion chamber. At least one scavenge passage is formed in the cylinder block for transferring an air charge compressed in the crankcase to the combustion chamber. The scavenge passage comprises a scavenge port configured such that reciprocating motion of the piston opens and closes the scavenge port. An exhaust passage is formed in the cylinder block for discharging exhaust gases from the combustion chamber. The exhaust passage comprises an exhaust port configured such that the reciprocating motion of the piston opens and closes the exhaust port. A fuel injector is disposed to inject fuel directly into the combustion chamber. The fuel injector includes an actuator. An exhaust control valve is operatively mounted in the exhaust passage and adapted to vary the effective cross-sectional area of the exhaust port. An exhaust control valve position sensor senses a position of the exhaust control valve is in electrical communication with a control unit. An exhaust system connected to the combustion chamber includes a catalyst. The engine further including means for increasing a temperature of the catalyst when the engine is operating at an engine speed less than a specified speed.

Still yet another aspect of the present invention is a method of controlling a two-cycle engine. The method comprises sensing a position of an exhaust control valve and sensing an engine speed. At least two injection characteristic maps are consulted. One of said at least two injection characteristic maps are selected. An injection characteristic is controlled based upon said selected one of said at least two injection characteristic maps.

Another aspect of the present invention is a method of increasing an operating temperature of a catalyst. The method comprises sensing an operating speed of an engine and adjusting a fuel injection characteristic when said engine is operating below a preset speed. The fuel injection characteristic being selected to create a fuel rich air/fuel charge within a combustion chamber.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENTS OF THE INVENTION

Figure 1:
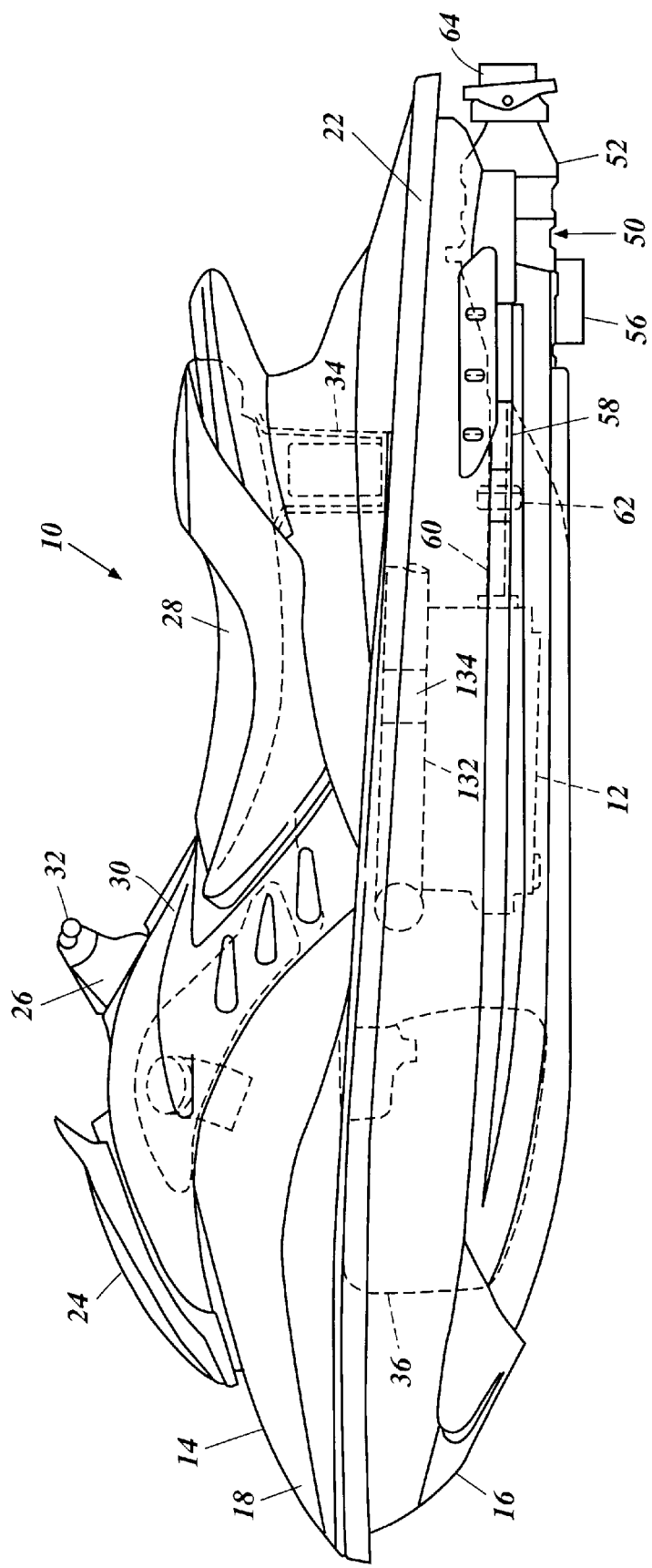
FIG. 1 is a side view of a watercraft powered by an engine having certain features and advantages according to the present invention.

With reference to FIG. 1, a personal watercraft 10 that employs an internal combustion engine 12 having certain features and advantages according to the present invention is illustrated. The present invention is described in the context of a personal watercraft because the engine configuration has particular utility with personal watercraft. However, those of skill in the art will readily appreciate that certain features and advantages of the present invention can also have utility in a wide variety of other settings, for example, without limitation, motorcycles, outboard motors, and snow mobiles.

With reference to FIG. 1, the personal watercraft 10 includes a hull 14 generally formed with a lower hull section 16 and an upper hull section or deck 18. Both the hull sections 16, 18 are made of, for example, a molded fiberglass reinforced resin. The lower hull section 16 and the upper hull section 18 are coupled together to define an internal cavity. A gunnel 22 defines an intersection of both the hull sections 16, 18.

The upper hull section 14 includes a hutch cover 24, a control mast 26 and a seat 28 one after another from fore to aft. In the illustrated arrangement, a bow portion 30 of the upper hull section 18 slopes upwardly and an opening is provided through which the rider can access the internal cavity. The hutch cover 24 is detachably affixed to the bow portion 30 so as to cover the opening.

The control mast 26 extends generally upwardly almost atop the bow portion 30 to support a handle bar 32. The handle bar 32 is primarily provided for controlling the direction of a water jet that propels the watercraft 10. The handle bar 26 carries control units such as, for example, a throttle lever (not shown).

The seat 28 extends along the center of the watercraft 10 at the rear of the bow portion 18. This area in which the seat 28 is positioned is a rider's area. The seat 28 has a saddle shape so that the rider can straddle it. Foot areas (not shown) are defined on both sides of the seat 28 and at the top surface of the upper hull section 18. The foot areas are generally flat. The seat 28 preferably is attached to the upper hull section 18 such that it can be selectively removed. An access opening (not shown), which provides access to the internal cavity, is defined under the seat 28. The seat 28 closes the access opening. In the illustrated arrangement, the upper hull section 18 also defines a storage box 34 that is positioned under the seat 28.

A fuel supply tank 36 is placed in the cavity under the bow portion 30 of the upper hull section 18. The fuel supply tank 36 is coupled with a fuel inlet port (not shown) positioned at a top surface of the upper hull section 18 through a duct (not shown). A closure cap (not shown) closes the fuel inlet port. The supply tank 36 can be accessed through the opening disposed under the hutch cover 24.

The engine 12 is located within an engine compartment defined by the cavity The engine compartment preferably is located under the seat 28. The rider thus can access the engine 12 through the access opening under the seat 28. Air is supplied to the engine compartment through one or more air intake ducts (not shown). Except for these air intake ducts, the engine compartment is substantially sealed to protect the engine 12 and a fuel supply system, including the fuel supply tank 36, from water.

A jet pump unit 50 propels the watercraft 10. The jet pump unit 50 includes a tunnel or jet pump housing 52 formed on the underside of the lower hull section 16. The jet pump housing 52 preferably is isolated from the engine compartment by a bulkhead (not shown). The tunnel 52 has an inlet port 56 that opens towards the body of water at its forward bottom. An impeller (not shown) is placed at a middle portion of the tunnel 52. An impeller shaft 58 extends forwardly from the impeller and is coupled with a crankshaft 60 of the engine 12 by a coupling member 62. The crankshaft 60 of the engine 12 thus drives the impeller shaft 58. The rear end of the tunnel 52 defines an outlet port (not shown). A steering nozzle 64 is affixed to the outlet port for pivotal movement about a steering axis extending generally vertically. The steering nozzle 64 is connected to the handle bar 32 by a cable (not shown) so that the rider can steer the nozzle 64.

When the impeller rotates, water from the surrounding body of water is drawn through the inlet port 56. The water is discharged through the outlet port as a jet of water. This water jet propels the watercraft 10. The rider can steer the steering nozzle 64 with the handle bar 32.

Figure 2:
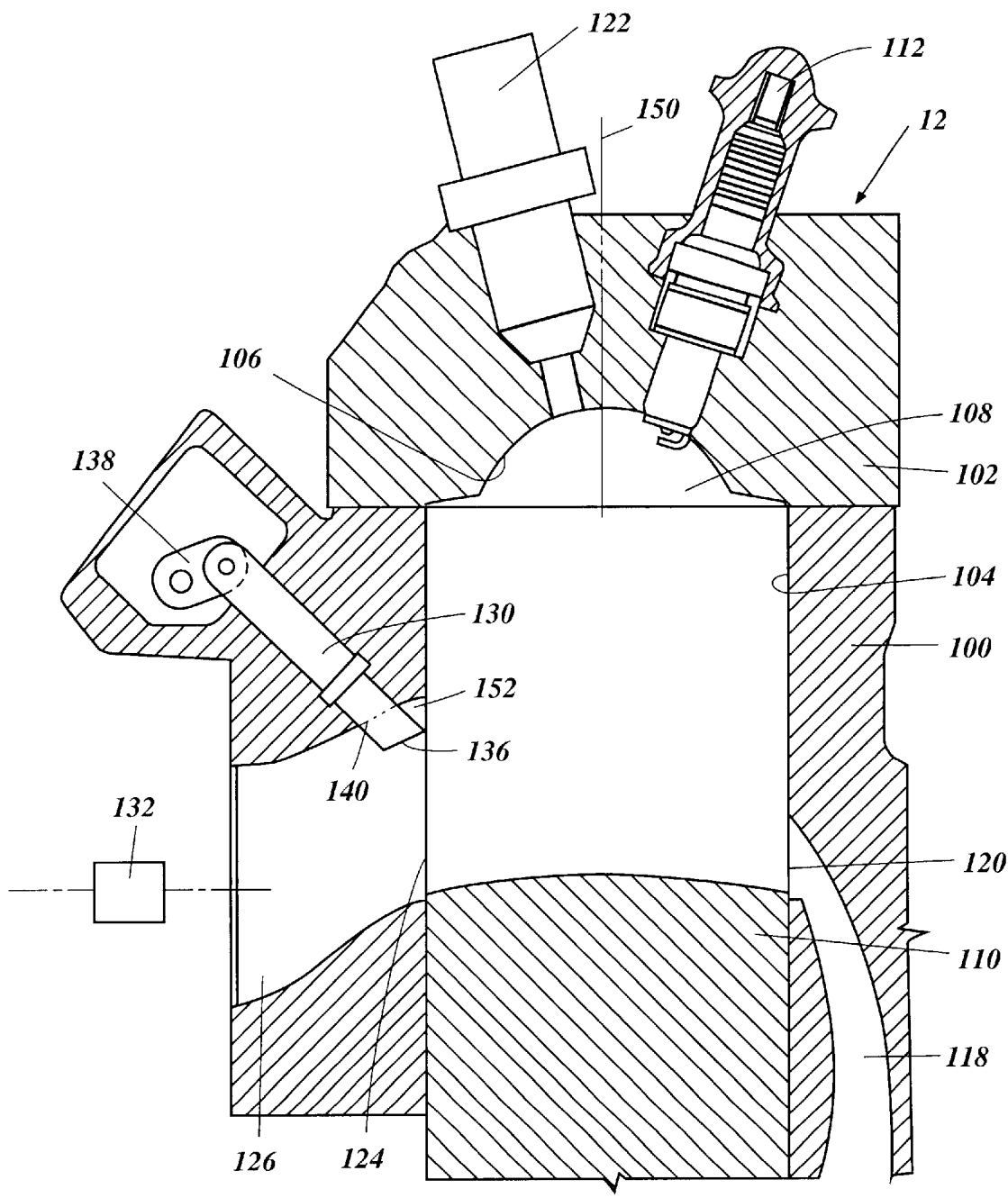
FIG. 2 is a cross-sectional view of a portion of the engine illustrated in FIG. 1.

FIG. 2 illustrates a portion of the two-stroke, direct injected engine 12, which powers the watercraft 10. The engine 12 has certain features and advantages according to the present invention. Only portions of the engine 12 are illustrated because the present invention relates primarily to the fuel injection timing of the engine 12. Where any details of the construction of the engine 12 are not illustrated or described, those of skilled in the art can readily practice the invention by resort to known technologies for those components and their interaction with the remaining components of the engine 12. Moreover, although the invention is described in conjunction with a two-stroke engine, it should be appreciated that certain features and aspects of the present invention can be achieved utilizing an engine operating on a different principal (e.g., four-cycle, rotary or diesel principals).

The engine 12 comprises a cylinder block 100 having a cylinder head 102 connected thereto. The cylinder block 100 defines at least one cylinder bore 104 therein, with the cylinder head 102 having a recessed area 106 cooperating with each bore 104 to define a combustion chamber 108. A piston 110 is movably positioned within each cylinder bore 104. The piston 110 is connected to the crankshaft 60 by a connecting rod (not shown). The crankshaft 60 is rotably journalled within a crankcase chamber (not shown) formed by the cylinder block 100.

A spark plug 112 has its discharge end positioned within the combustion chamber 108 for igniting an air and fuel charge within the combustion chamber 108. The discharging of the spark plug 112 is preferably controlled by an electronic control unit (ECU) 114 of the engine 12 through an ignition circuit 116 (see FIG. 3). Preferably, the ignition circuit 112 includes a power source (not shown), such as an alternator or magneto, and a voltage increasing coil, for firing of the spark plug 112, as is well known in the art. The ECU 114 will be described in more detail below.

An intake passage (not shown) is provided through the cylinder block 100 for providing an air to the combustion chamber 108. The intake passage is connected to a suitable intake system. Preferably, the intake system draws air from within the engine compartment through a silencer (not shown). The air then selectively passes through the intake passage into the crankcase chamber as controlled by a reed valve (not shown), as is known in the art. As is also well known in the art, an intake passage and corresponding reed valve preferably are provided corresponding to each cylinder 104. The crankcase chamber is compartmentalized to provide the crankcase compression features for each combustion chamber 108 as is well known in the operation of two-cycle engines. The air charge within the crankcase chamber is delivered to each combustion chamber 108 through several scavenge passages 118 in the cylinder block 100. The passage 118 terminate at a number of scavenge ports 120 formed on the cylinder bore 104.

The engine 12 also preferably includes a suitable fuel supply system (not shown) for supplying pressurized fuel to the combustion chamber 108. The fuel supply system comprises a fuel injector 122, which delivers fuel directly to the combustion chamber 108. The fuel injector 122 preferably is of the electronic type and receives fuel at a regulated pressure through a fuel manifold (not shown) of the fuel supply system. The fuel injector 122 includes an injection valve (not shown), which controls the injection of fuel into the combustion chamber. The injection valve preferably is operated by an electronic solenoid (not shown), which is controlled by the ECU 114 (see FIG. 3). Accordingly, the ECU 114 controls the injection timing and the amount of fuel injected into the combustion chamber 108, as will be explained in more detail below. It should be appreciated that construction of the fuel injector 122 may be of any known type and, in accordance with some features of the invention, the injector 122 can be configured to inject fuel and pressurized air.

The fuel/air charge formed in the combustion chamber 108 is fired at an appropriate interval by the spark plug 112. The burning of the gases causes the propagation of a rapid flame front in the combustion chamber 108 and the expansion of the gases drives the piston 110 downwardly. At an appropriate time, an exhaust port 124 formed in the cylinder bore 104, which communicates with an exhaust passage 126 in the cylinder block 100, will open. The timing of the flow through of exhaust gases through the exhaust passage 126 preferably is controlled by a exhaust timing control device 130, which will be described in detail below.

The exhaust gases generated by the engine 12 are routed from the engine to a point external the watercraft 10 by an exhaust system (not shown), which communicates with the exhaust passage 126 described above. The exhaust gases preferably flow from the exhaust passage into an exhaust manifold (not shown), which is connected to a side of the engine 12. The exhaust manifold preferably is connected to an expansion pipe 132 (see FIG. 1). Preferably, a three-way catalyst 132 is positioned within the expansion pipe 132 to remove nitric oxides, carbon monoxide and hydrocarbons from the exhaust gases. The catalyst 132 preferably comprises a honeycomb catalyst flow-through structure, as is well know in the art, surrounded by a casing. The expansion pipe preferably is connected to a water lock (not shown), which is, in turn, connected to a rear exhaust pipe (not shown) which has its opening in communication the water flowing through in the pump unit 50.

With continued reference to FIG. 2, the exhaust timing control device 130 will now be described in more detail. The illustrated exhaust timing control device 130 includes a valve 136 that has a generally flat or plate-like body having a first end positioned in the passage 126 of the exhaust port 124. The other end is in contact with a cam 138. The valve 136 is arranged to move between a first retracted or "open" position 140, in which the valve 136 does not generally obscure the passage 126, and a second extended or "closed" position, in which the valve obscures a portion of the passage 126. When in its retracted position, the valve 136 is in an "advancing" position, because the timing of the flow of exhaust from the cylinder occurs soon as the piston 110 moves downwardly in the cylinder. In this position, the timing of the closing of the passage 126 as the piston 110 moves up is delayed. On the other hand, when in the extended position, the valve 136 is in a "retarding" position, because the flow of exhaust from the cylinder is delayed since the piston must move farther down the cylinder before the passage 126 is opened. In this same position, the timing of the closing of the passage 126 as the piston 110 moves up is advanced. Of course, the valve 136 may be moved to a variety of positions between the first and second positions.

The exhaust timing control device 130 preferably is actuated by a drive unit 142 (see FIG. 3), which can include a servo motor arranged to move the cam 138 connected to the valve 136. In the situation where the motor is powered in only one direction, the valve 136 is preferably arranged to be biased, such as with a spring coils to the first position. The drive unit 142 preferably is controlled by the ECU 114. Accordingly, the control of the valve 136 preferably is part of a larger engine control system 115 arranged to also control other aspects of the engine, such as ignition and fuel injection. The engine control system 115 preferably includes an exhaust valve position sensor 131, which senses the position of the exhaust valve 136. The engine control system 115 will be described in more detail below.

Figure 4:
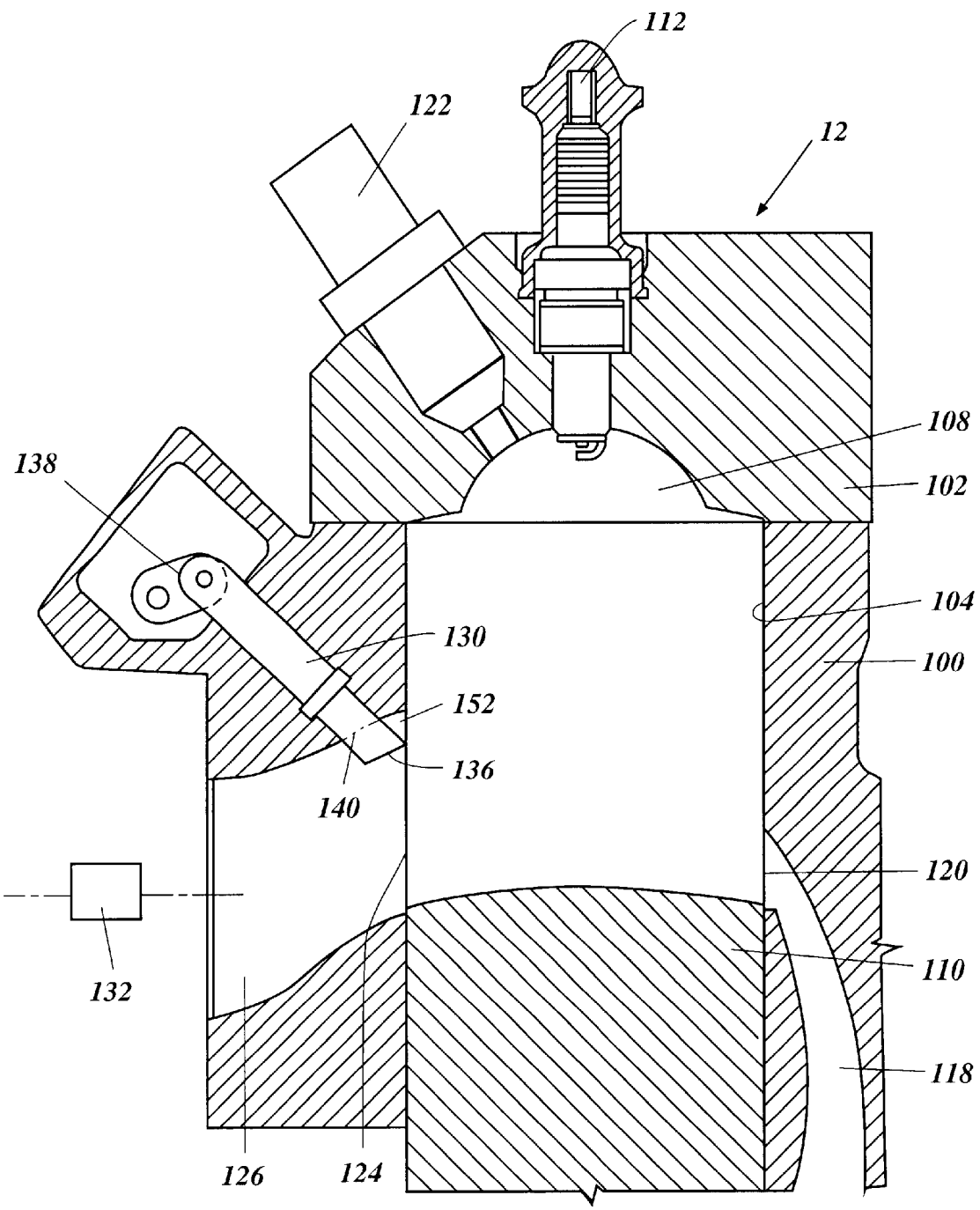
FIG. 4 is cross-sectional view of a portion of a modified arrangement of the engine illustrated in FIG. 1.

The spark plug 112 and the fuel injector 122 in the illustrated in FIG. 2 are located at an angle relative to a centerline 150, which extends through the cylinder bore 104. However, it should be appreciated that the spark plug 112 and the fuel injector 122 can be positioned differently. For example, as illustrated in FIG. 4, the spark plug 112 can be positioned along the centerline of the cylinder bore 104 while the fuel injector 122 is positioned at an angle relative to the spark plug 112. It should also be appreciated that certain features and aspects of the present invention can be employed with indirect fuel injection (i.e., where the fuel injector 122 is positioned in the intake passage).

Figure 5:
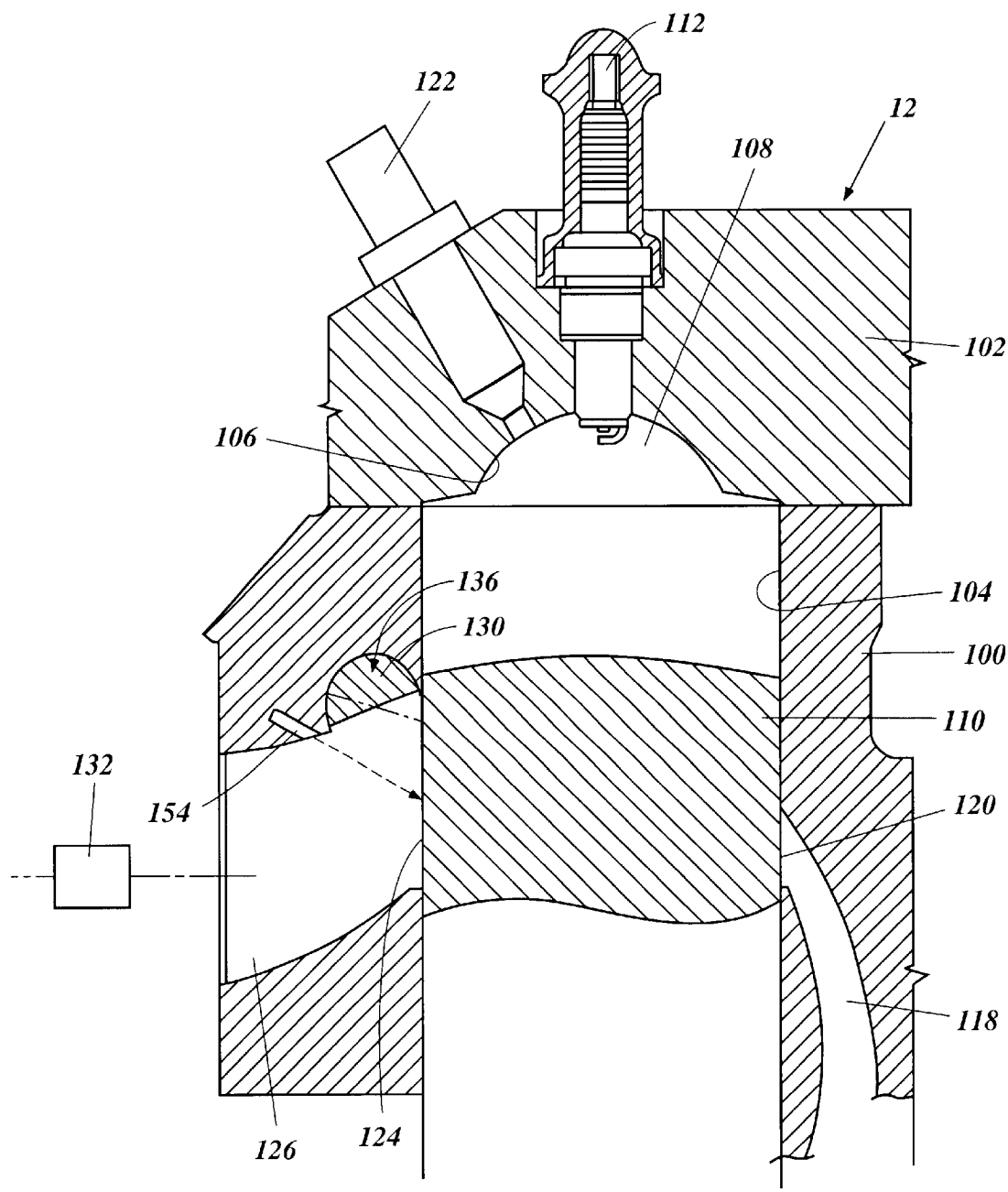
FIG. 5 is cross-sectional view of a portion of a another modified arrangement of the engine illustrated in FIG. 1.
Figure 6:
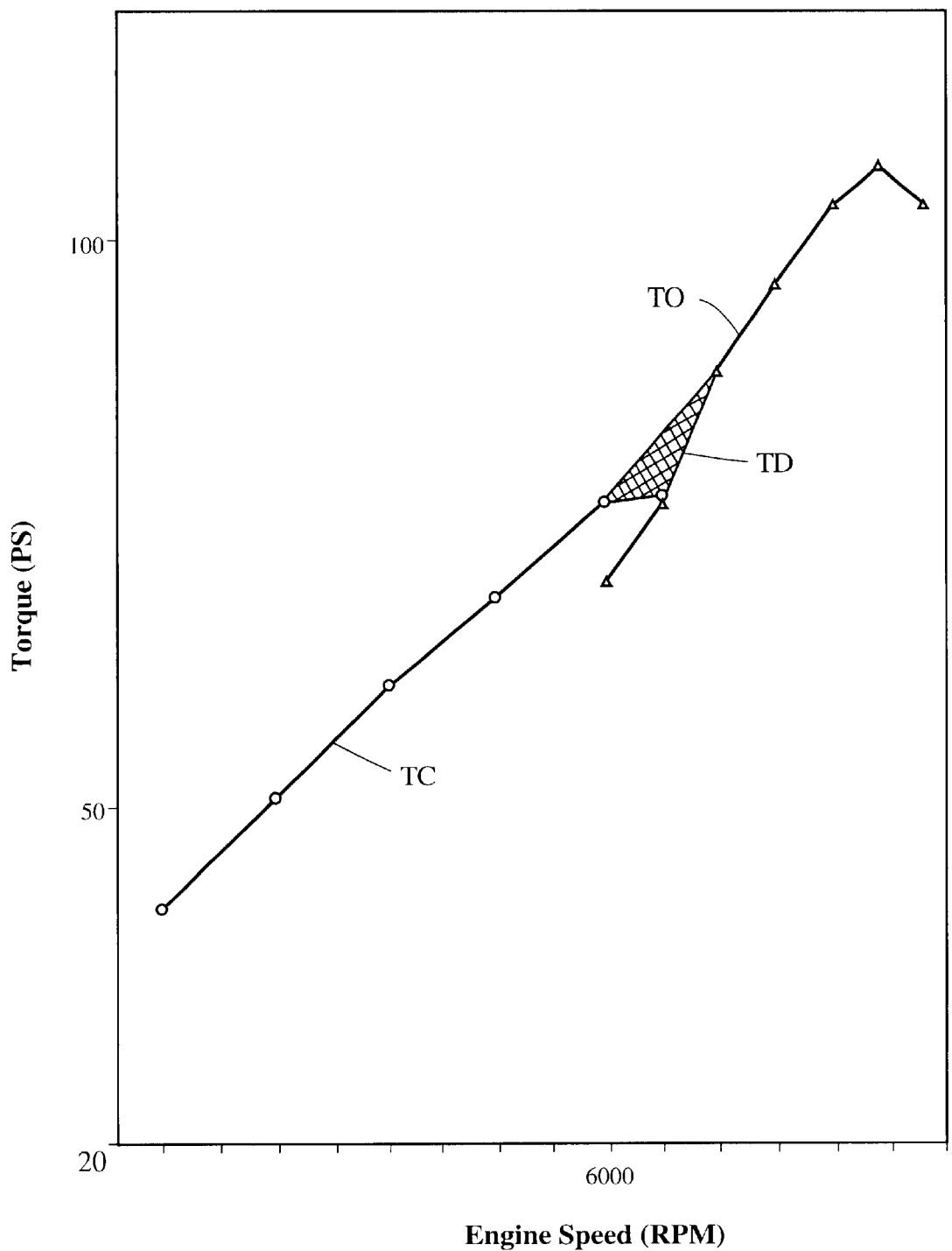
FIG. 6 is a graph illustrating the torque of the engine as a function of engine speed.

The sliding type exhaust control valve 136 described above forms a triangular gap 152 between the valve 136 and the exhaust port 124 when the valve 136 is in the closed position. Highly pressurized combustion gases can leak out of this gap 152. As shown in FIG. 6, this can produce a torque ditch TD (as indicated by the cross hatching) at the transition between the torque curve when the valve 136 is closed TC and the torque curve when the valve 136 is opened TO. This transition typically occurs at approximately 6000 RPM. This torque ditch TD can cause the engine to stall when the watercraft jumps from or lands in the water. To solve this problem, a half-circle exhaust valve 136 as shown in FIG. 5 can be used. In addition, the positioning of the exhaust control valve can be altered to reduce or eliminate the pocket or gap 152.

The engine 12 preferably also includes a suitable lubrication system, which provides lubricant to the various moving parts of the engine 12. Such a system can include a lubricant tank or reservoir (not shown) from which lubricant is delivered and circulated throughout the engine 12. In the illustrated arrangement, the lubrication system includes a lubricant supply nozzle 154 (see FIG. 5), which is located in the exhaust passage 126. The lubricant supply nozzle 154 lubricates the bore 104, the piston 110 and the exhaust control valve 136.

Figure 3:
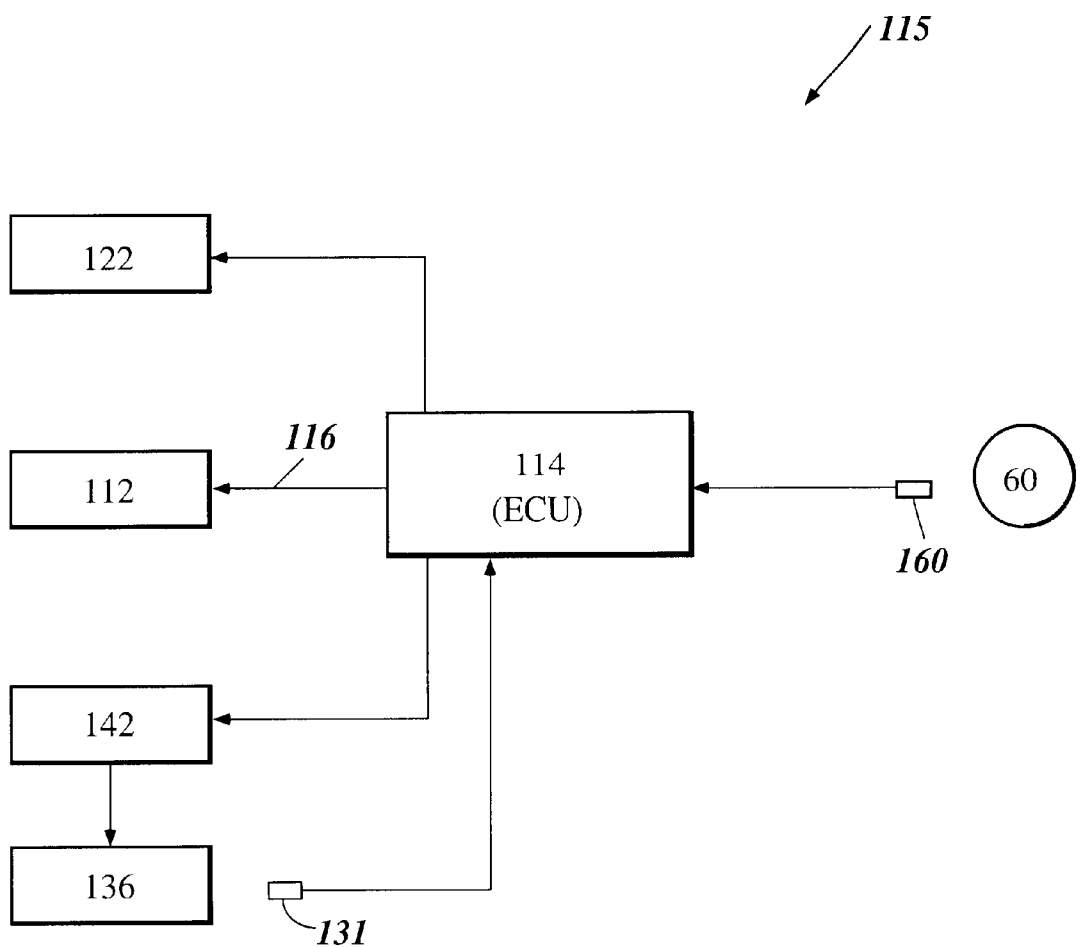
FIG. 3 is a schematic illustration of a control system for the engine illustrated in FIG. 1.

As mentioned earlier, the engine 12 is controlled by the engine control system 115, which is illustrated schematically in FIG. 3. To control the engine 12, the engine control system 115 utilizes maps and/or indices stored within the memory of the ECU 114. The maps and/or indices can be correlated to the data collected from various sensors. For example, the engine control system 115 collects data from an engine speed sensor 160, which is associated with the crankshaft 60 (see FIG. 1) to determine engine speed, as is well known in the art. This type of sensor is well known and can comprise a magnetic sensor, which senses the passage of one or more magnets mounted on the crankshaft 60. Of course, those of skill in the art will recognize that engine speed can be determined in a number of ways as known to those skill in the art.

It is to be noted that the ECU 114 may be in the form of a hard wired feed back control circuit that can perform the functions described below. Alternatively, the ECU may be constructed of a dedicated processor and a memory for storing a computer program configured to perform functions described below. Additionally, the ECU can be a general purpose computer having a general purpose processor and memory for storing a computer program that performs the functions described below.

Figure 7A:
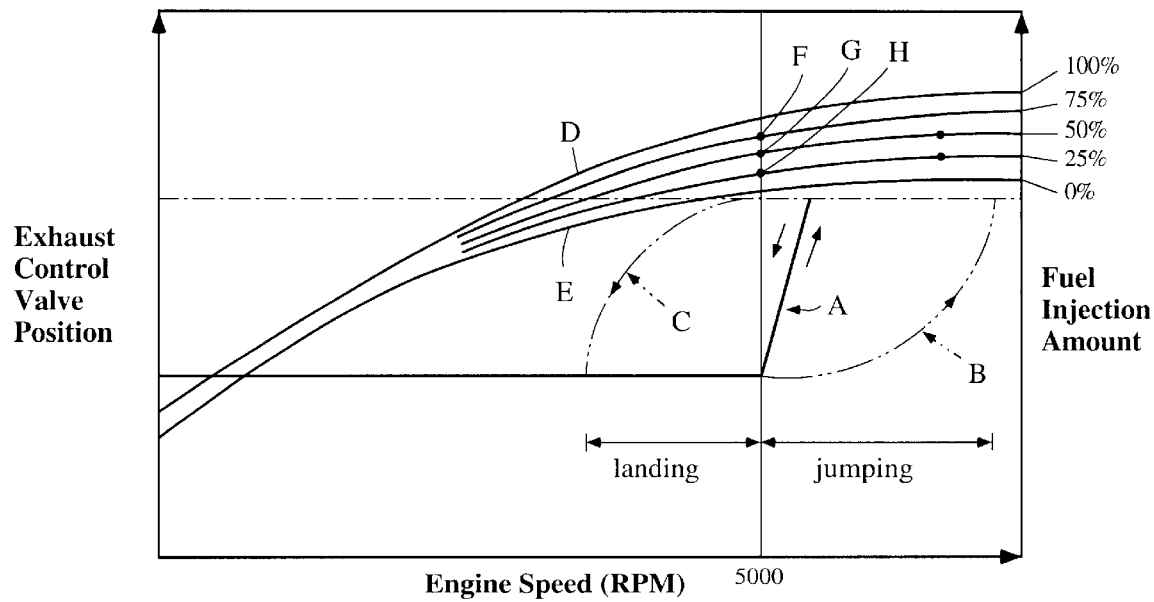
FIG. 7A is a control map illustrating the position of an exhaust control valve and a fuel injection amount as a function of engine speed.
Figure 8:
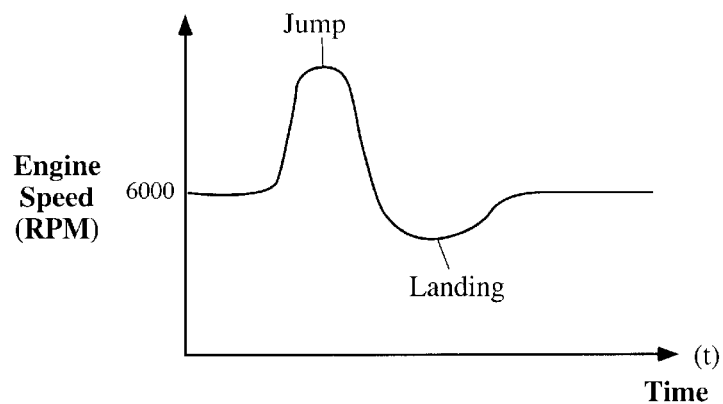
FIG. 8 is a graph illustrating an engine speed of the engine as the watercraft jumps and lands.

The ECU 114 preferably includes an exhaust timing valve control map such as the one illustrated in FIG. 7A for controlling the opening and closing of the exhaust timing valve 130. The ECU 114 is preferably arranged such that the exhaust control valve 130 moves from a closed position to an open position at approximately 6000 RPM. When engine speed increases or decrease slowly, the valve opens and closes along line A. Under such conditions, the response delay caused by the servo motor 142 does not dramatically effect engine performance. However, as indicated by FIG. 8, during jumping and landing the engine speed increases/decreases quickly. Under such conditions, because of the response delay of the servo motor 142, the valve opens/closes slower than the change in engine speed as indicated by lines B and C of FIG. 7A.

As mentioned above, the response delay can cause the engine to stall or combust irregularly. Specifically, when the engine speed increases quickly, the engine control system delivers more fuel to the engine. However, because of the response delay, the exhaust control valve is only partially opened while more fuel is being delivered to the engine. Because the exhaust control valve is not opened to the desired degree, less air enters the combustion chamber and exhaust gas flow from combustion chamber is restricted. This results in a rich air/fuel ratio, which can cause irregular combustion when the watercraft jumps out of the water. Correspondingly, when the engine speed decreases quickly, the engine control system delivers less fuel to the engine. However, because of the response delay, the control valve is partially opened while less fuel is delivered to the engine. This results in too much air entering the combustion chamber in comparison to the amount of fuel being delivered. This results in a lean air/fuel ratio, which can cause the engine to stall.

To prevent or minimize the irregular combustion and/or stalling during jumping and/or landing, the ECU 114 preferably includes an fuel injection amount control map, which also is illustrated in FIG. 7A. The map provides data that can be used to control the amount of fuel injected into the combustion chamber 108 in response to the sensed position of the exhaust valve 136. As illustrated by curve D, the map includes a first set of injection amounts that depend upon engine speed when the exhaust control valve 136 is opened. The map also includes a second set of injection amounts that depend on engine speed when the exhaust valve is closed as indicated by curve E. As shown, for the same engine speed, less fuel is injected into the combustion chamber 108 when the exhaust valve is closed as compared to when the exhaust valve is opened.

The control map further includes curves between curve D and curve E, which are based on the detected exhaust valve position and the detected engine speed. More specifically, in the illustrated arrangement, curves F, G, and H are fuel injection maps for when the exhaust control valve 136 is at 75%, 50% and 25% open, as detected by the exhaust valve detection sensor 131. It should be appreciated that the ECU 114 can include additional maps for more or different exhaust valve positions.

Figure 7B:
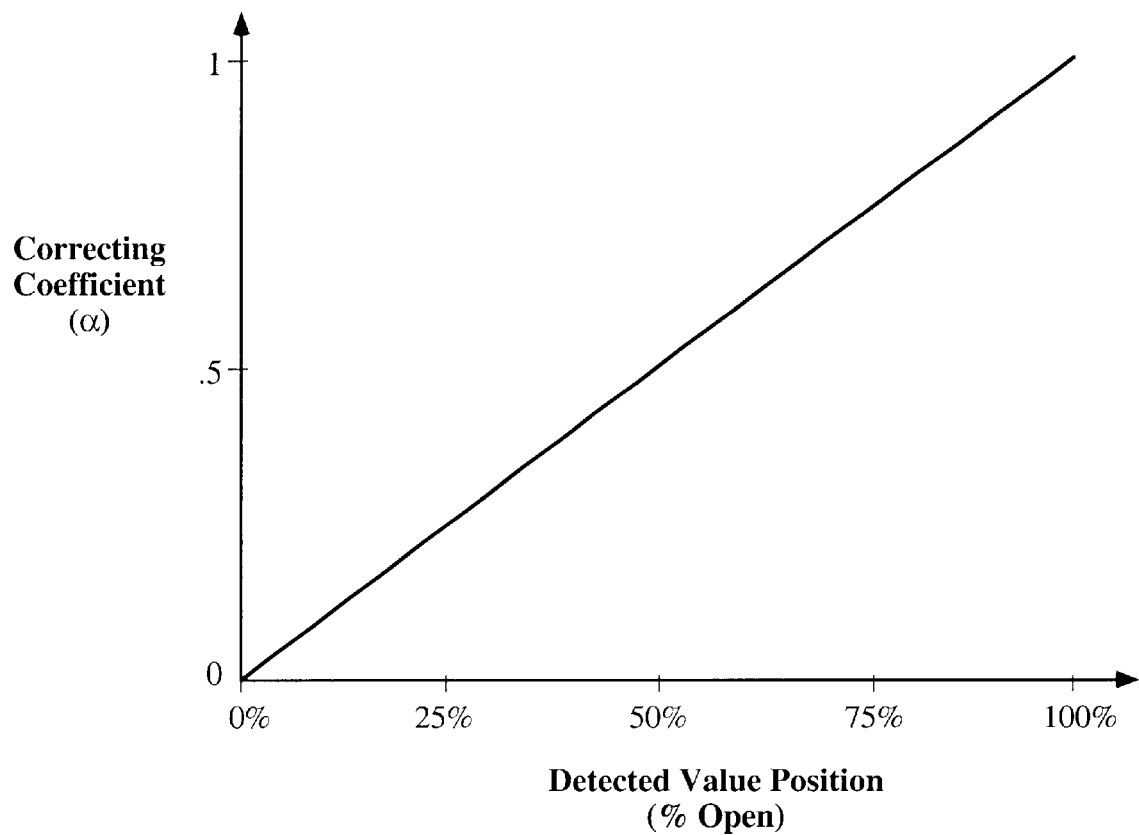
FIG. 7B is another control map illustrating a correcting coefficient as a function of a detected position of an exhaust control valve.

In a modified arrangement, the ECU 114 can utilize the control map such as that illustrated in FIG. 7B. This control map provides a correcting coefficient α, which is based upon the detected position of the exhaust valve. The correcting coefficient α can be used with the following equation to determine the fuel injection amount:

$$\text{Injection Amount} = \alpha(F_o - F_c) + F_c$$

In this equation, $F_O$ is the injection amount, as indicated by the control map of FIG. 7A when the exhaust valve is open. $F_C$ is the injection amount as indicated by the control map of FIG. 7A when the exhaust valve is closed. It should be appreciated that the control map of FIG. 7B does not need to be linear.

This arrangement prevents or minimizes irregular combustion and engine stall during jumping and landing. Specifically, if the exhaust valve 136 opens too slowly as shown in curve B of FIG. 7A, the engine control system correspondingly adjusts the fuel injection amount based upon the detected position of the exhaust valve and the control maps of FIGS. 7A or 7B. Accordingly, the engine control system 115 provides less fuel to the combustion chamber 108. Similarly, if the exhaust valve 136 closes too slowly as shown in curve C of FIG. 7A, the engine control system correspondingly adjusts the fuel injection amount based upon the detected position of the exhaust valve and the control maps of FIGS. 7A or 7B. Accordingly, enough fuel is injected into the combustion chamber to prevent engine stall and to prevent irregular combustion.

Figure 9A:
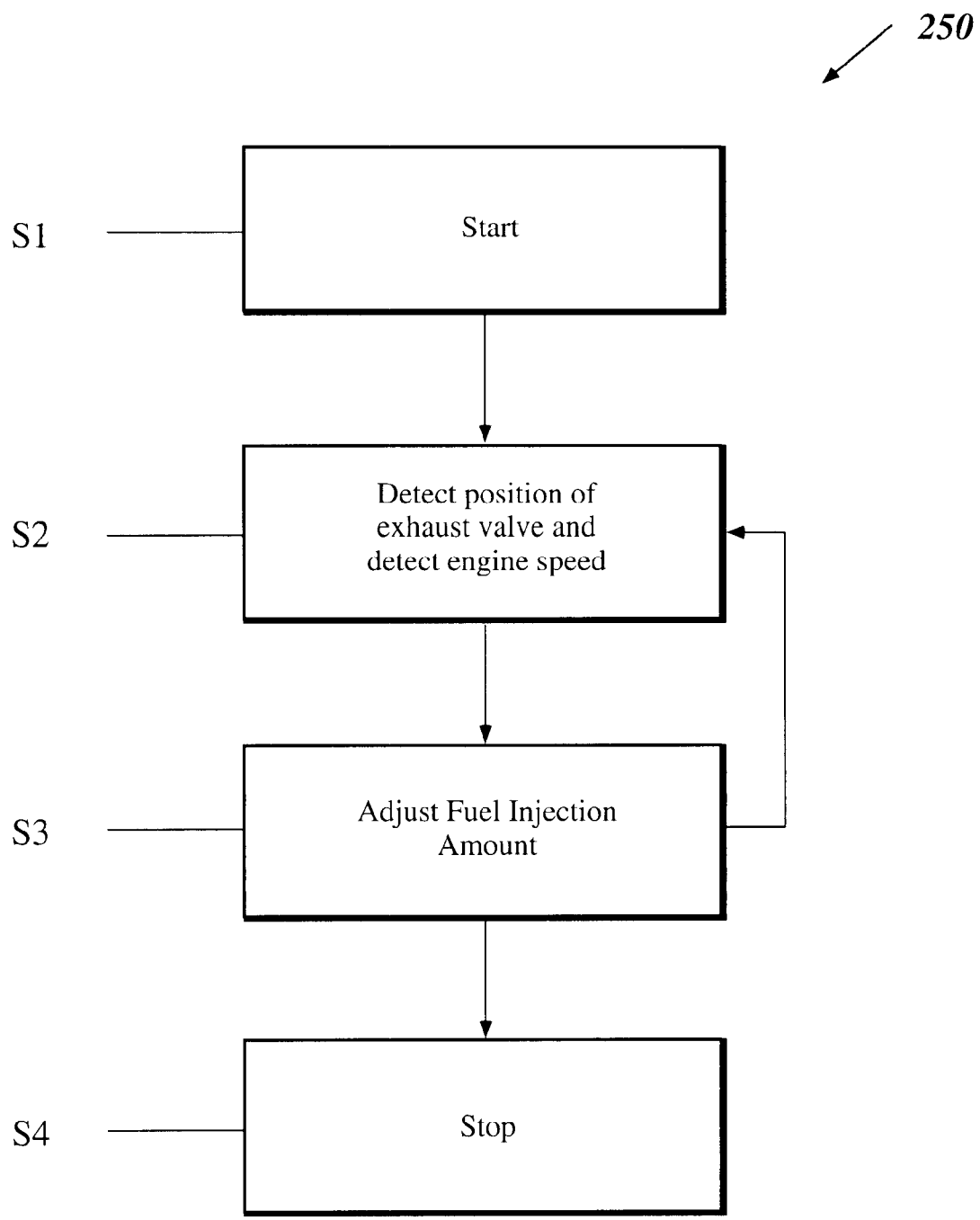
FIG. 9A is a subroutine that can be utilized by the control system of FIG. 3.

FIG. 9A illustrates a control subroutine 250 that can be executed by the ECU 114 to prevent the engine 12 from stalling as the watercraft 10 jumps and lands. As shown in FIG. 9A and represented by operational block S1, the illustrated control system 115 initializes when an ignition starting device (e.g., a key activated switch) is activated.

As represented by operational block S2, the control system 115 detects the position of the exhaust control valve 130 from the exhaust control valve sensor 131 (see FIG. 3) and detects the engine speed from the engine speed sensor 160 (FIG. 3). Then as indicated by operational block S3, the control system 115 adjusts the fuel injection amount based upon a control map such as the control maps described above. The control system 115 continues to detect the position of the exhaust valve and the engine speed until the engine is stopped. The fuel control system 115 preferably stops, as is indicated by operational block S4, when the engine 12 is turned off.

Figure 10:
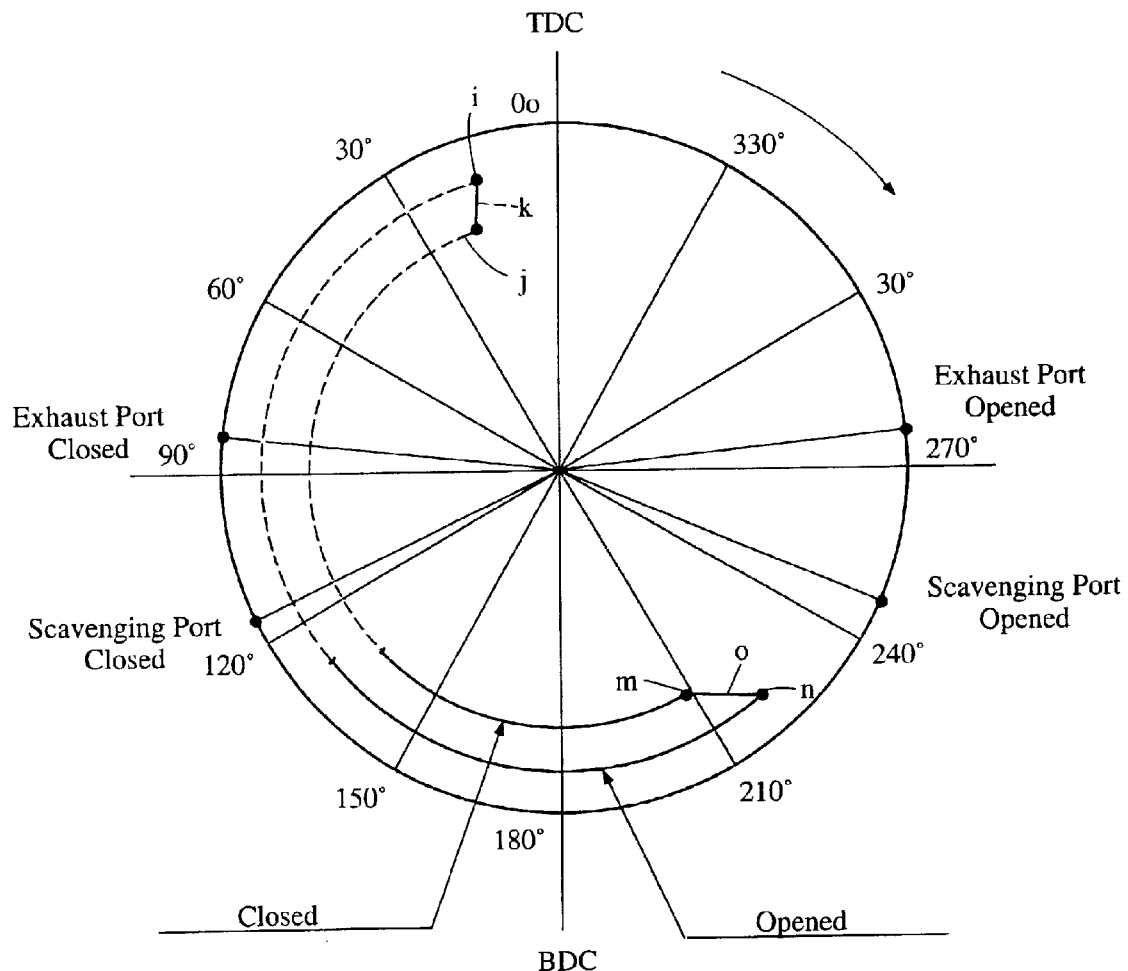
FIG. 10 is a timing diagram illustrating the start of fuel injection and the ignition timing of the engine.

As seen in the timing diagram of FIG. 10, the ignition timing and the start of fuel injection preferably are also varied based upon the sensed position of the exhaust valve 136. Specifically, as indicated by labels i and j, the ignition timing preferably is advanced when the exhaust valve is closed (low engine speed) and is retarded when the exhaust valve is opened (high engine speed). Moreover, for exhaust valve positions between open and closed, the ignition timing preferably is adjusted as indicated by line k in response to the sensed position of the exhaust valve 136. This arrangement maximizes power and minimizes knocking when the compression ratio increases as the exhaust valve 136 moves towards a closed position. Furthermore, as indicated by labels m and n, the start of fuel injection preferably is advanced when the exhaust valve 136 is open and retarded when the exhaust valve 136 is closed. As indicated by line o, the start of fuel injection preferably is also adjusted in response to the sensed position of the exhaust valve 136. The start of fuel injection is determined, in part, upon the balance between removing the exhaust gases and having the need to prevent excessive blowby.

Figure 9B:
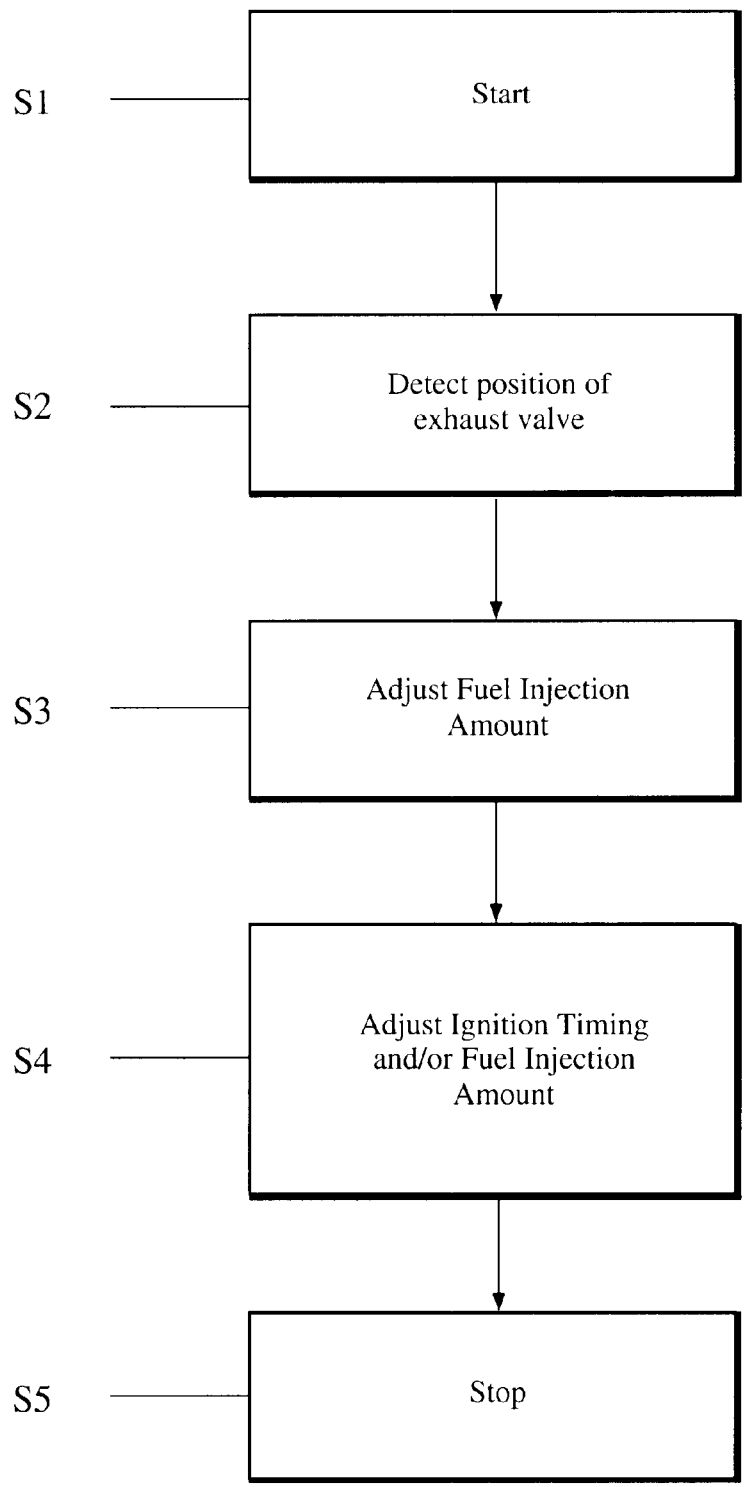
FIG. 9B is a modified subroutine that can also be utilized by the control system of FIG. 3.

FIG. 9B illustrates a control subroutine 252 that also can be executed by the ECU 114 to prevent the engine 12 from stalling as the watercraft 10 jumps and lands. As shown in FIG. 9B and represented by operational block S1, the illustrated control system 115 initializes when an ignition starting device (e.g., a key activated switch) is activated.

As represented by operational block S2, the control system 115 detects the position of the exhaust valve 136 from the exhaust control valve sensor 131 (see FIG. 3) and detects the engine speed from the engine speed sensor 160 (FIG. 3). Then as indicated by operational block S3, the control system 115 adjusts the fuel injection amount based upon a control map, such as the control maps described above. The control system 115 also adjusts the ignition timing and/or the fuel injection timing based upon an ignition timing and/or an fuel injection timing control map, such as the ones described above, along with the sensed position of the exhaust valve 136 and the engine speed as indicated by operational block S3. The control system 115 continues to detect the position of the exhaust valve and the engine speed to adjust the fuel injection amount, the ignition timing and/or fuel injection timing until the engine is stopped. The fuel control system 115 preferably stops as is indicated by operational block S5 when the engine 12 is turned off.

Figure 11:
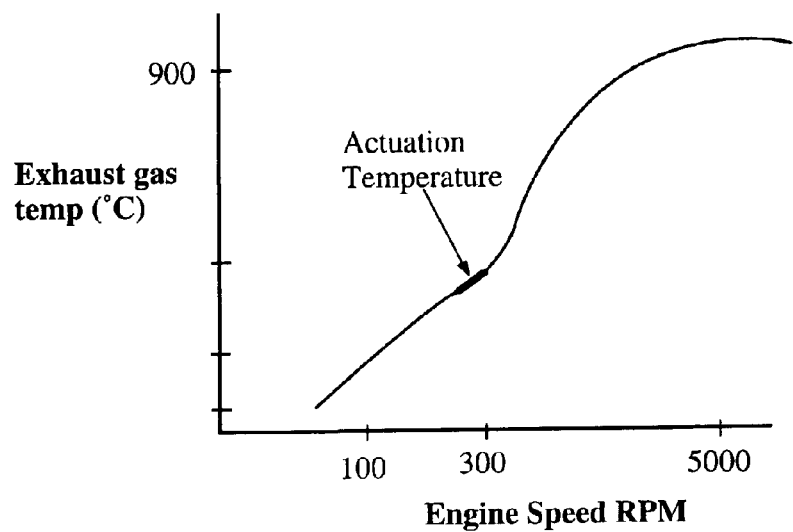
FIG. 11 is a graph illustrating the exhaust gas temperature as a function of engine speed.

As mentioned above, watercrafts are required to drive under a certain speed (e.g. below 10 Km/hour) near the shore and/or swimming areas. However, as shown in FIG. 11, exhaust gas temperatures are lower at low engine speeds. Moreover, the catalyst is not activated until the temperature of the exhaust gas entering the catalyst reaches 250–300 C. For the exhaust gas to reach this temperature, the watercraft 10 usually needs to be traveling around 25 Km/hour (i.e., planing speed of more than 2000–3500 RPM). However, as described above, theses speeds often are precluded near the shore and/or swimming areas. In these areas, the watercraft 10 much travel slowly and the exhaust gas temperature usually stays about 100 C. Thus, the catalyst is not activated and the exhaust gas cannot be cleaned.

Figure 12:
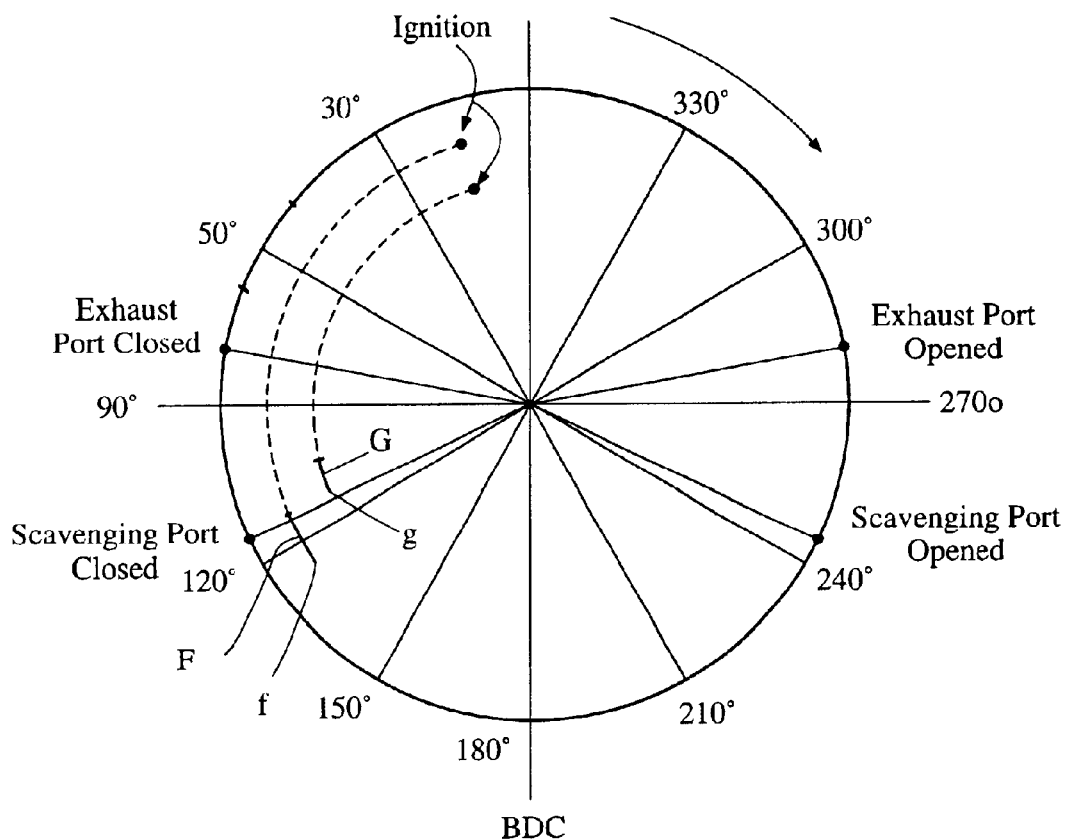
FIG. 12 is a timing diagram illustrating the start of fuel injection and the duration of fuel injection for an engine with a catalyst and without a catalyst.

To solve this problem, the ECU 114 of the engine control system 115 preferably includes a control map similar to the one illustrated in FIG. 12. The ECU 114 uses this control map to control the start of fuel injection and ignition during low speeds (e.g., less than 2000 RPM).

For an engine with a catalyst, the solid line F represents the fuel injection duration, and f represents the start of fuel injection. The solid line F represents the fuel injection duration when an engine speed is approximately 1300 RPM. As the engine speed increases, the start of fuel injection f remains the same while the fuel injecting duration becomes longer as shown by the dashed lines. Preferably, when the engine speed is approximately 1300 RPM, the fuel injection starts at approximately 125° before top dead center (TDC) and the fuel injection duration is approximately 12°. More preferably, the fuel injection starts before the scavenging port closes.

The illustrated engine 12, which features an exhaust system that includes the catalyst 134, is arranged to have early fuel injection start timing f and longer injecting duration F as compared to an engine without a catalyst. With continued reference to FIG. 12, a solid line G represents the fuel injection duration for an engine without a catalyst and g represents the start of fuel injection. When the engine speed is 1300 RPM, the start of fuel injection g occurs at approximately 110° before TDC (i.e., approximately 15 later) and the fuel injection duration is approximately 8° (i.e., approximately 4 shorter). Note that start of fuel injection g occurs after the scavenging port closes.

Because of the advanced fuel injection in the illustrated engine 12 unburned hydrocarbons are ejected from the combustion chamber. Moreover, the increased fuel injection duration makes air/fuel ratio richer, which increases the amount of unburned hydrocarbons present in the exhaust gases. The hydrocarbons can be burned inside the three way catalyst 134 to elevate the catalyst to a temperature of 250–300° C., which is sufficiently high enough to activate the catalyst 134 and to remove the nitric oxides and carbon monoxide in the exhaust gases.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combination or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A two-cycle, internal combustion engine comprising a cylinder block that defines a cylinder bore, a cylinder head fixed at one end of the cylinder block enclosing one end of the cylinder bore, a crankcase member fixed at the other end of the cylinder block and enclosing the other end of the cylinder bore, the crankcase member forming a crankcase chamber, a piston positioned in the cylinder bore, a crankshaft rotably journaled in the crank case and driven by the piston, the piston, the cylinder bore, the cylinder head together defining a combustion chamber, at least one scavenge passage formed in the cylinder block for transferring an air charge compressed in the crankcase to the combustion chamber, the scavenge passage comprising a scavenge port configured such that reciprocating motion of the piston opens and closes the scavenge port, an exhaust passage formed in the cylinder block for discharging exhaust gases from the combustion chamber, the exhaust passage comprising an exhaust port configured such that the reciprocating motion of the piston opens and closes the exhaust port, a fuel injector mounted to inject fuel directly into the combustion chamber, the fuel injector comprising an actuator to regulate an amount of fuel injected by the fuel injector, an exhaust control valve extending into the exhaust passage and adapted to control the effective cross-sectional area of the exhaust port, an exhaust control valve position sensor that senses a position of the exhaust control valve, the position sensor being electronically connected to a control system, the control system comprising a controller that is configured to control the position of the exhaust control valve, the amount of fuel injected by the fuel injector, and to receive a signal from the exhaust control valve position sensor, the controller being further configured to increase the effective cross-sectional area of the exhaust port when an engine speed increases beyond a specified value and to adjust the amount of fuel injected into the combustion chamber based upon the sensed position of the exhaust control valve and the engine speed.

2. The engine as set forth in claim 1, wherein the engine further comprises an engine speed sensor which is arranged to detect rotation of the crankshaft, the engine speed sensor being in electronical communication with the control system, the engine speed sensor being adapted to produce a signal that is indicative an engine speed and the controller being configured to determine the amount of fuel to inject into the combustion chamber based upon a control map that is based upon the sensed position of the exhaust valve and the engine speed.

3. The engine as set forth in claim 2, wherein the controller is also configured to control a start of fuel injection based upon the sensed position of the exhaust valve.

4. The engine as set forth in claim 3, wherein the controller is generally configured to advance the start of fuel injection when the exhaust valve is in a generally open position and to retard the start of fuel injection when the exhaust valve is in a generally closed position.

5. The engine as set forth in claim 2, wherein the engine further comprises a spark plug that extends into the combustion chamber, the controller being configured to control a firing of the spark plug in response to the sensed position of the exhaust valve.

6. The engine as set forth in claim 5, wherein the controller is generally configured to advance the firing of spark plug when the exhaust valve is in a generally closed position and to retard when the firing of the spark plug when the exhaust valve is in a generally closed position.

7. The engine as set forth in claim 1, wherein the exhaust control valve is a rotary-exhaust control valve.

8. The engine as set forth in claim 1, wherein the exhaust control valve is a knife-exhaust control valve.

9. The engine as set forth in claim 1, further comprising an exhaust system for discharging exhaust gases from the exhaust port to the atmosphere, the exhaust system including a catalyst, the controller further configured to adjust a start of fuel injection and a fuel injection duration to increase the level of unburnt hydrocarbons entering the catalyst at engine speeds below approximately 2000 revolutions per minute.

10. The engine as set forth in claim 9, wherein the controller is configured such that the start of fuel injection occurs before the scavenge port closes.

11. The engine as set forth in claim 9, wherein the controller is configured to adjust the start of fuel injection such that it is advanced as compared to a start of fuel injection of an engine without a catalyst and such that the duration of fuel injection longer as compared to a duration of fuel injection in the engine without the catalyst.

12. A method of operating a two-cycle internal combustion engine said method including sensing a position of an exhaust control valve, sensing an engine speed, adjusting an amount of fuel injected by a fuel injector based upon the sensed position of the exhaust control valve and the engine speed.

13. The method as set forth in claim 12, further comprising adjusting a firing time of a sparkplug based upon the sensed position of the exhaust valve.

14. The method as set forth in claim 13, further comprising adjusting a fuel injection timing based upon the sensed position of the exhaust valve.

15. The as set forth in claim 12, further comprising adjusting a fuel injection timing based upon the sensed position of the exhaust valve.

16. A two-cycle internal combustion engine comprising a cylinder block that defines a cylinder bore, a cylinder head fixed at one end of the cylinder block enclosing one end of the cylinder bore, a crankcase member fixed at the other end of the cylinder block and enclosing the other end of the cylinder bore, the crankcase member defining a crankcase chamber, a piston positioned in the cylinder bore, a crankshaft rotably journaled in the crank case and driven by the piston, the piston, the cylinder bore, the cylinder head together defining a combustion chamber, at least one scavenge passage formed in the cylinder block for transferring an air charge compressed in the crankcase to the combustion chamber, the scavenge passage comprising a scavenge port configured such that reciprocating motion of the piston opens and closes the scavenge port, an exhaust passage being formed in the cylinder block for discharging exhaust gases from the combustion chamber, the exhaust passage comprising an exhaust port configured such that the reciprocating motion of the piston opens and closes the exhaust port, a fuel injector disposed to inject fuel directly into the combustion chamber, the fuel injector including an actuator, an exhaust control valve operatively mounted in the exhaust passage and adapted to vary the effective cross-sectional area of the exhaust port, an exhaust control valve position sensor that senses a position of the exhaust control valve and that is in electrical communication with a control unit, an exhaust system connected to the combustion chamber and including a catalyst, a controller that is configured to control timing and duration of fuel injection, the controller being further configured to increase the amount of hydrocarbons flowing through the catalyst when the engine is operating at an engine speed less than a specified speed by adjusting at least one of the timing or the duration of fuel injection.

17. The engine as set forth in claim 16, wherein the specified speed is less than 2000 revolutions per minute.

18. The engine as set forth in claim 16, wherein the specified speed is an engine speed an associated small watercraft is no longer planing.

19. A method of controlling a two-cycle engine, the method comprising sensing a position of an exhaust control valve, sensing an engine speed, consulting at least two injection characteristic maps, selecting one of said at least two injection characteristic maps and controlling an injection characteristic based upon said selected one of said at least two injection characteristic maps.

20. The method of claim 19, wherein said injection characteristic is an injected amount.

21. The method of claim 20 further comprising controlling an ignition timing based at least in part upon said sensed position of said exhaust control valve.

22. The method of claim 20 further comprising controlling an injection initiation timing based at least in part upon said sensed position of said exhaust control valve.

23. The method of claim 20 further comprising actuating said exhaust control valve between an open position and a closed positioned based upon a sensed engine speed.

24. The method of claim 23, wherein actuating said exhaust control valve comprises rotating said exhaust control valve.

25. The method of claim 20, wherein said plurality in injection characteristic maps comprise a map for an open exhaust control valve and a map for a closed exhaust control valve.

26. The method of claim 20, wherein said fuel injection amount is increased when said engine speed is below a preset engine speed.

27. The method of claim 20, wherein said fuel injection timing also is advanced when said engine speed is below a preset engine speed.

28. The method of claim 19, wherein said injection characteristic is controlled based upon a coefficient that depends upon said exhaust valve position.

29. The method of claim 28, wherein said coefficient increases in value as said exhaust valve is opened.

30. The method of claim 29, wherein said coefficient is linearly increased in value as said exhaust valve is opened.

31. A method of increasing an operating temperature catalyst, the method comprising sensing an operating speed of an engine and adjusting a fuel injection characteristic when said engine is operating below a preset speed, the fuel injection characteristic being selected to create a fuel rich air/fuel charge within a combustion chamber.

32. The method of claim 31, wherein said fuel injection characteristic comprises a fuel injection amount and said fuel injection amount is increased when said engine is operating below said preset speed.

33. The method of claim 31, wherein said fuel injection characteristic is a fuel injection amount and adjusting said fuel injection amount is accomplished by adjusting a fuel injection duration.

34. The method of claim 33, wherein said fuel injection amount is increased when said engine is operating below said preset speed by extending a fuel injection duration.

35. The method of claim 31, wherein said fuel injection characteristic comprises a fuel injection start timing and said fuel injection start timing is advanced when said engine is operating below said preset speed.

36. A method for controlling a two-cycle engine, the method comprising determining an engine speed, using the engine speed to determine a target position for an exhaust control valve, moving the exhaust valve towards the target position, sensing a position of the exhaust control valve, and determining a fuel injection amount from at least the sensed position of the exhaust valve and the engine speed.

37. The method of claim 36 further comprising adjusting an ignition timing based at least in part upon the sensed position of the exhaust control valve.

38. The method of claim 36 further comprising controlling an injection initiation timing based at least in part upon the sensed position of the exhaust control valve.

39. A method for controlling a two-cycle engine, the method comprising determining an engine speed, adjusting a position of an exhaust valve based upon the engine speed, sensing the position of the exhaust valve, using at least the sensed position of the exhaust control valve to select a fuel injection map, and using engine speed to select a fuel injection amount from the selected fuel injection map.

40. The method of claim 39 further comprising adjusting an ignition timing based at least in part upon the sensed position of the exhaust control valve.

41. The method of claim 39 further comprising controlling an injection initiation timing based at least in part upon the sensed position of the exhaust control valve.

* * * * *